United States Patent [19]

Goor

[11] Patent Number: 4,954,904
[45] Date of Patent: * Sep. 4, 1990

[54] METHOD AND APPARATUS FOR PREVENTING HEAD CRASHES IN A DISK SYSTEM

[75] Inventor: Dan Goor, Colorado Springs, Colo.

[73] Assignee: Goor Associates, Inc., Colorado Springs, Colo.

[*] Notice: The portion of the term of this patent subsequent to Mar. 21, 2006 has been disclaimed.

[21] Appl. No.: 283,838

[22] Filed: Dec. 13, 1988

Related U.S. Application Data

[62] Division of Ser. No. 125,000, Nov. 24, 1987, Pat. No. 4,814,907.

[51] Int. Cl.$^5$ ............................................. G11B 21/21
[52] U.S. Cl. ................................. 360/75; 360/103; 360/109; 369/44.11
[58] Field of Search ................. 360/75, 102, 103, 104, 360/109; 369/44, 45

[56] References Cited

U.S. PATENT DOCUMENTS

| | | | |
|---|---|---|---|
| 408,465 | 8/1889 | Dewey | 310/90.5 |
| 2,377,175 | 5/1945 | Peer | 310/90.5 |
| 3,155,977 | 11/1964 | Marrs | 346/74 |
| 3,191,179 | 6/1965 | Pelech et al. | 346/74 |
| 3,842,753 | 10/1974 | Theodore et al. | 105/157 R |
| 3,937,148 | 2/1976 | Simpson | 104/148 MS |
| 3,941,402 | 3/1976 | Yankowski et al. | 280/124 R |
| 4,244,629 | 1/1981 | Habermann | 308/10 |
| 4,325,586 | 4/1982 | Hubert et al. | 308/10 |
| 4,562,430 | 12/1985 | Robinson | 340/870.37 |
| 4,629,262 | 12/1986 | Hamilton | 310/90.5 |
| 4,814,907 | 3/1989 | Goor | 360/75 |

FOREIGN PATENT DOCUMENTS

| | | |
|---|---|---|
| 54-104814 | 8/1979 | Japan . |
| 58-68275 | 4/1983 | Japan . |
| 58-164064 | 9/1983 | Japan . |
| 60-61965 | 4/1985 | Japan . |

OTHER PUBLICATIONS

"Optical-Memory Media," Edward Rothchild, Optical Memory Newsletter, POB 14817, San Francisco, CA 94114, Mar. 1983 BYTE Publications, Inc., pp. 86–106.
"The Winchester Odyssey," Jim Toreson, Xebec, 432 Lakeside Dr., Sunnyvale, CA 94086, Mar. 1983 Byte Publications, Inc., pp. 122–128.
"Building a Hard-Disk Interface for an S-100 Bus System," Andrew C. Cruce and Scott A. Alexander, ASC Assocs., Inc., POB 615, Lexington Park, MD 20653, Mar. 1983 Byte Publications, Inc., pp. 130–148.

Primary Examiner—Robert L. Richardson
Assistant Examiner—David L. Robertson
Attorney, Agent, or Firm—Weingarten, Schurgin, Gagnebin & Hayes

[57] ABSTRACT

Improved apparatus and a method are disclosed for controlling the flying height of a head over a rotating medium, such as used in a rigid disk drive employing magnetic, magneto-optic or optical recording techniques. The flying height is controlled via magnetic attraction or repulsion to maintain a selected and substantially uniform flying height of the head with respect to the rotating medium.

6 Claims, 6 Drawing Sheets

FIG. 6
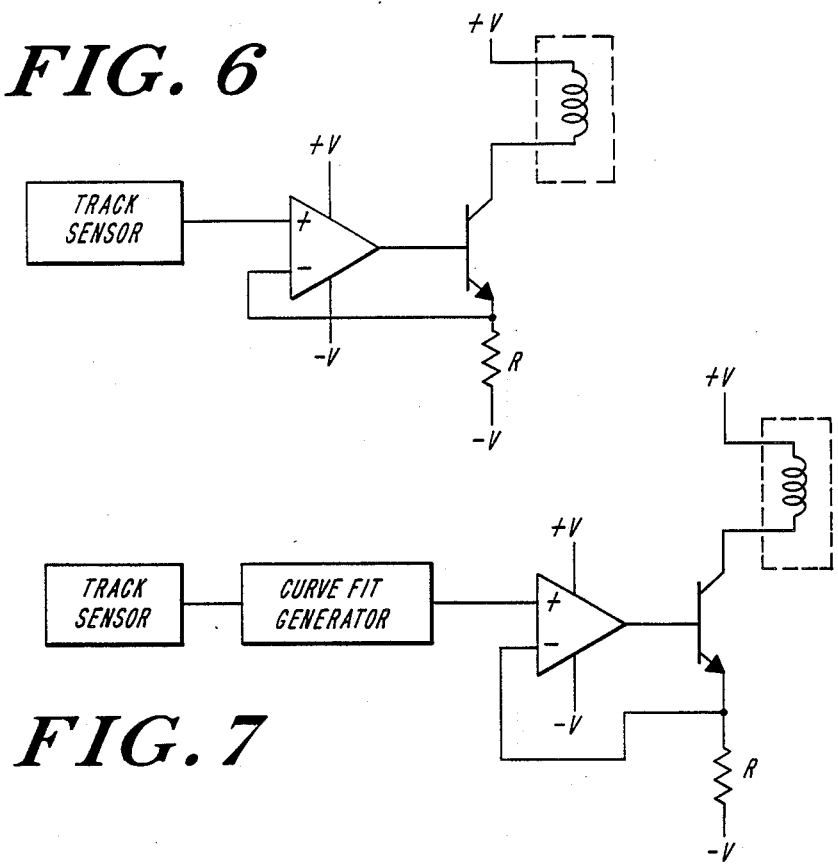
FIG. 7
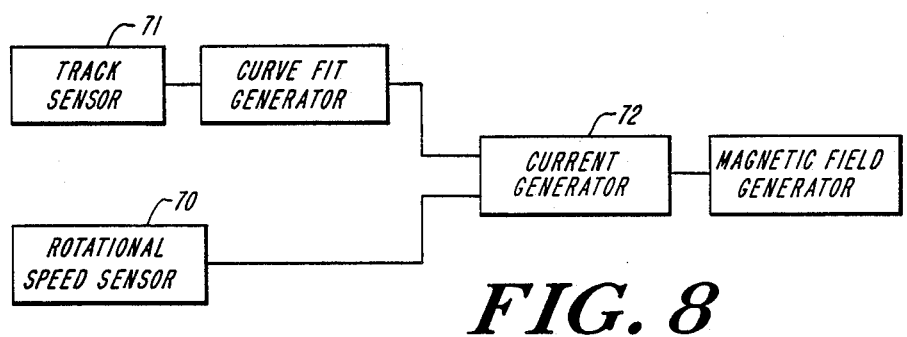
FIG. 8
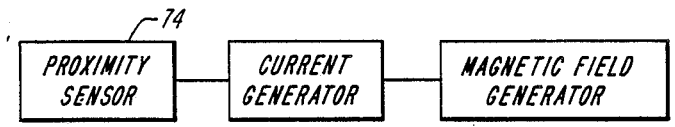
FIG. 9

METHOD AND APPARATUS FOR PREVENTING HEAD CRASHES IN A DISK SYSTEM

This application is a division of application Ser. No. 07/125000, filed Nov. 24, 1987, now U.S. Pat. No. 4,814,907.

FIELD OF THE INVENTION

This invention relates to disc drives for computer systems and more particularly to a method and apparatus for controlling the flying height of a read and/or write head with respect to the surface of a rotating disk.

BACKGROUND OF THE INVENTION

With the advent of more and more powerful computers, it has become increasingly important to have available large capacities of data storage for use in conjunction with such computers. The prevailing technologies for such storage, typically referred to as "secondary storage" include magnetic tape and rotating disks. Rotating disks include "rigid" or "hard" disks, also known as "Winchester" disks.

Rigid disks include an extremely smooth circular platter fabricated of aluminum or other suitable material The platter is typically coated with a thin magnetic film or coating. Binary data is stored on the magnetic medium via electro magnetic or magneto optic techniques well known in the art. Alternatively, binary data is stored on a layer via known optical recording techniques. Such techniques are described in an article entitled "Data-Storage Technologies for Advanced Computing" appearing in the October 1987 issue of *Scientific American*.

Traditional hard disks suffer from operational characteristics which adversely effect the storage capacity of the device, the useability of the disk in environments subject to mechanical shock and vibration, and in thin atmosphere such as encountered at high elevations and in space.

To date, efforts to increase the recording density on hard disks have included changes in the head design to increase the linear bit density, reduction in the width of the head to reduce the track widths thereby permitting greater track densities and via the use of thinner layers of magnetic media.

While it has been recognized that positioning the head closer to the medium, i.e. reducing the flying height, would permit greater recording densities, it has been generally believed that reducing the flying height would be extremely difficult in practice (see *Scientific American*, October 1987, Page 120).

The difficulties associated with increasing the recording density by reducing the flying height are in part a consequence of the mechanism employed to establish the flying height in rigid disk drives. Heads in rigid disk drives typically ride on an "air bearing" which cause the head to be supported on a cushion of air approximately six to twelve micro-inches above the surface of the rotating disk. The flying height is a function of the relative velocity between the head and the rotating disk. The velocity of the head with respect to the disk at any given concentric track radius on the disk is equal to the circumference of the disk at the given track times the speed of revolution of the disk. Since the relative velocity of the head with respect to the disk is directly proportional to the radius, and since the flying height is a function of the relative velocity between the head and the disk, the flying height at the outside diameter of the disk is considerably greater then the flying height at the inside diameter of the disk. As a consequence of the fact that the flying height increases as a function of radius in conventional hard disk systems with a corresponding decrease in linear bit recording densities, the recording capacities achieved in such systems are greatly reduced.

Another disadvantage associated with the use of air bearing as the primary means of supporting the head is that upon removal of power (power down), the head "lands" on the media and upon application of power (power up), the head contacts the media during "takeoffs" resulting in head wear and abrasion of the media. To address the problem of media abrasion and corruption of data in conventional hard disk systems, a landing zone is often provided which is devoid of recorded data. While this approach prevents the loss of recorded data, it does not address the problems associated with signal degradation due to head wear occurring during take offs and landings

SUMMARY OF THE INVENTION

In accordance with the present invention a method and apparatus are disclosed for controlling the flying height of a head with respect to the surface of an adjacent rotating media. A layer is deposited on the disk via sputtering, vacuum deposition techniques, plating, or through any other means known in the art. The layer is formed of a material which becomes magnetic upon the application of an electric current such that the magnetic field is proportional to the amount of current applied. The applied layer of magnetic material is employed as a levitation layer. Alternatively, a coil is printed or otherwise disposed on the disk for generating a magnetic field upon the application of an electric current to the coil. Another means for generating a magnetic field is affixed to the structure supporting the head. By controlling the magnetic fields on either the magnetic field generating means associated with the head, the magnetic layer or coil on the rotating media, or both, the attraction or repulsion of the head with respect to the media is controlled as a function of the head position along the disk radius so as to maintain the head at a substantially constant selected flying height above the disk. By controlling the flying height of the head with respect to the disk, storage capacities may be greatly increased, access times reduced, and a disk system may be constructed which is substantially less susceptible to mechanical shock and vibration than conventional systems. Furthermore, a disk system in accordance with the present invention and employing the described magnetic levitation techniques, may be employed in thin atmospheres such as encountered at high elevations and in space. Finally, the use of the presently described magnetic levitation technique avoids mechanical contact between the head and the disk, thereby eliminating the need for landing zones and associated head wear resulting from abrasion of the head during takeoffs and landings.

BRIEF DESCRIPTION OF THE DRAWINGS

These and other features are more fully set forth in the solely exemplary detailed description and accompanying drawings of which:

FIG. 6 is a schematic diagram illustrating a means for generating a magnetic field which varies as a function of the radial location of the head;

FIG. 7 is a schematic diagram illustrating a means for generating a magnetic field which varies as a function of the radial location of the head and for making corrections for nonlinearities in the flying height versus velocity curve;

FIG. 8 is a block diagram showing a means for controlling the magnetic field as a function of both the radial location of the head and the rotational speed of the disk;

FIG. 9 is a block diagram illustrating a means for controlling the magnetic field directly as a function of flying height;

DETAILED DESCRIPTION OF THE INVENTION

Figure 1A:
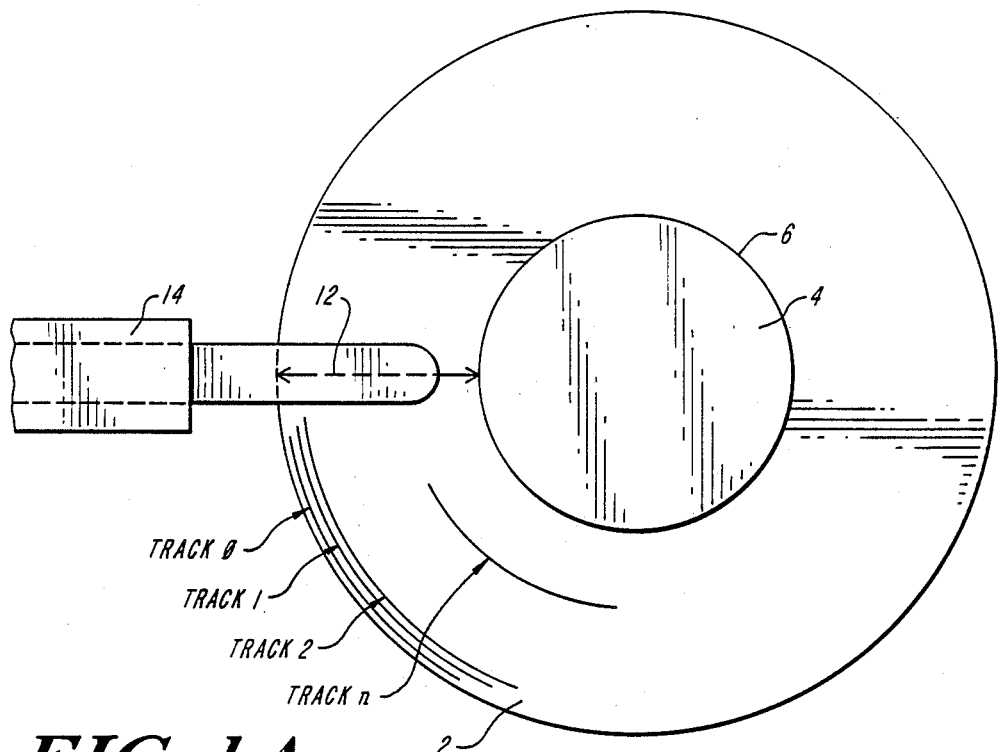
FIG 1A is a top schematic view of a rigid disk system employing a linear actuator.

Rigid or hard disk drives are employed in computer systems to store large volumes of data. Such drives include one or more rigid circular platters or disks, which, in operation, rotate at high speeds around a central axis perpendicular to the plane of the platter. The platter is employed to store desired data via any of a number of known recording techniques such as magnetic recording, magneto-optic recording and optical recording. A head which is selectively movable substantially along a radius of the disk is employed to read data from the disk or write data to the disk at selected tracks corresponding to specific radii of the disk. The head is movable to select any one of the desired tracks via either a linear actuator or a rotary actuator as depicted in FIGS. 1A-2B respectively.

To obtain high linear recording densities on the platter along any specified track, it is desirable to have the head in close proximity to the surface of the disk. In typical systems known in the art, the head is typically maintained within five to twenty micro-inches of the platter surface and is supported on a air bearing. The flying height of the head over the surface of the disk in a system employing an air bearing is a function of the relative velocity between the head and the underlying disk. The relative velocity between the head and the disk at any given radius is equal to the product of the circumference times the rotational speed of the disk. Thus, the relative velocity between head and the disk at the outer diameter of the disk far exceeds the relative velocity between the head and the disk at the inner diameter. Consequently, the flying height of a head employing a typical air bearing to maintain the disk/head separation, is considerable greater at the outer diameter than at the inner diameter of the usable data storage area.

Systems known in the art seldom attempt to fly the heads above the surface of the disk at a height less than 2-3 micro-inches under laboratory conditions and less in commercial environments measuring than six micro-inches at the inner diameter of the usable storage area to assure that the head does not "crash" or contact the surface of the disk during normal operation. A minimum gap of typically six micro-inches is maintained to account for irregularities in the smoothness of the disk surface and variations in the rotational concentricity of the disk within the desired plane perpendicular to the rotational axis. Because present disk systems specify the minimum flying height at the inner diameter of the usable storage area, and because the relative velocity between the head and the disk increases with increasing radius, the flying height at the outer diameter is less than optimum and will likely exceed the flying height at the inner diameter by a factor of 2 or 3. More particularly, in typical rigid disk systems, the flying height at the outer diameter of a nine inch disk system might be twelve micro-inches or greater, while the flying height at the inner diameter is approximately 6 micro-inches.

Since, the magnetic flux fields spread with increasing distance from magnetic poles the achievable linear recording density decreases with increasing flying height in a magnetic system. Because present rigid disk systems optimize the flying height at the inner diameter of the useful recording area and have a less than optimal flying height at the outer diameter of the disk, the storage capacities achieved are substantially reduced and the optimum linear recording density is not achieved.

Likewise, when a magnetic read head is employed in conventional magneto-optic systems, the read head is unable to sense magnetic dipoles at the outer diameter of the disk when written at the same linear density a at the inner diameter of the signal storage area.

Figure 1B:
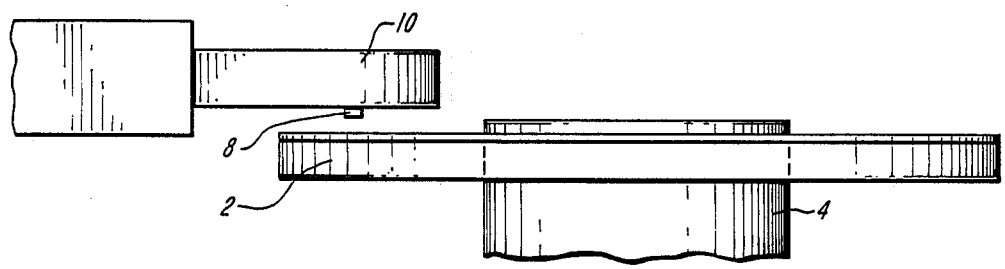
FIG. 1B is a side cut-away schematic view of the rigid disk system of FIG. 1A.

A rigid disk employing a linear actuator is illustrated in FIGS. 1A and 1B The system includes a rigid disk 2 which is mounted to a hub 4 via a clamp ring 6. The hub 4 is driven by a motor (not shown) and rotates at high speed to cause the disk 2 to rotate at the speed of revolution of the hub 4.

In a system employing conventional magnetic recording techniques, the disk 2 is coated with a magnetic medium such as iron oxide, iron oxide coated with cobalt, chromium dioxide or any other suitable magnetic material. Additionally, various thin film metallic alloys containing nickel and cobalt have been employed. As illustrated in FIG. 1B, a read-write head 8 is affixed to an arm 10 which is movable linearly along a radius 12 of the disk 2 via a linear actuator 14. In a magnetic recording system, the head 8 may include a ring shaped core having a number of turns of wire wrapped around the core. Upon the passage of electric current through the wire, magnetic flux in induced in the core. The direction of the magnetic flux is controlled via the direction of the current through the coil. A pattern of magnetization is induced upon the magnetic medium coated on the disk by controlling the pattern of current reversals through the head and thereby impressing a corresponding magnetization pattern upon the disk.

As illustrated in FIG. 1A, binary data are normally recorded on thin concentric circular rings called tracks. The tracks, by industry convention, are typically numbered consecutively from track 0 at the outer diameter of the disk to track N at the inner diameter. The overall capacity of a disk is determined by summing the product of the linear bit density of each track times the circumference of the track.

Figure 2A:
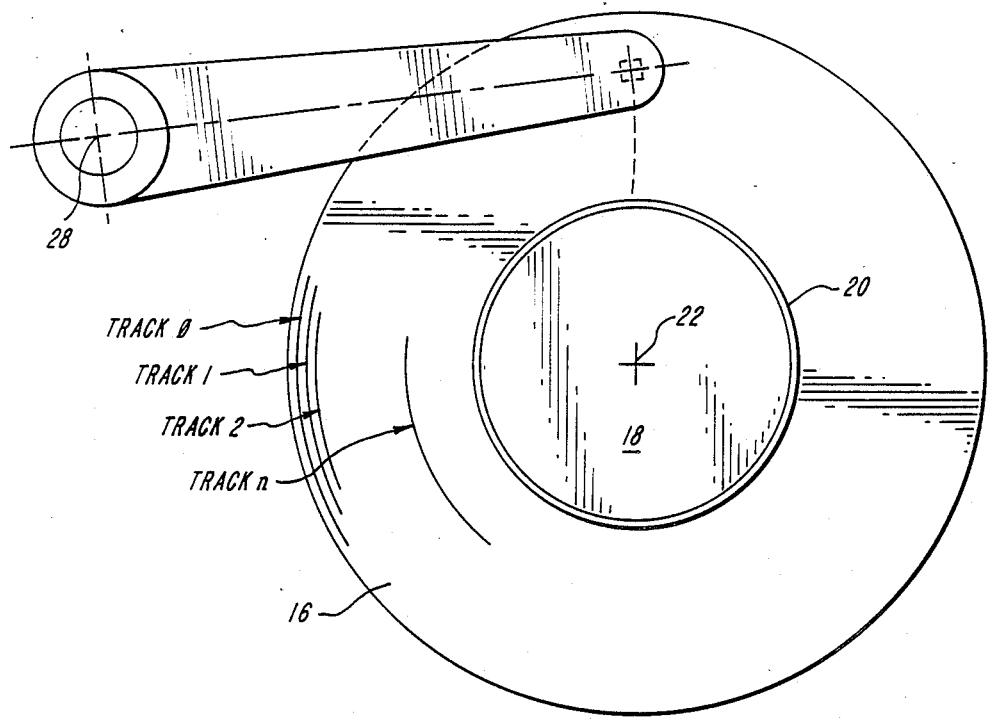
FIG. 2A is a top schematic view of a rigid disk system employing a rotary actuator.
Figure 2B:
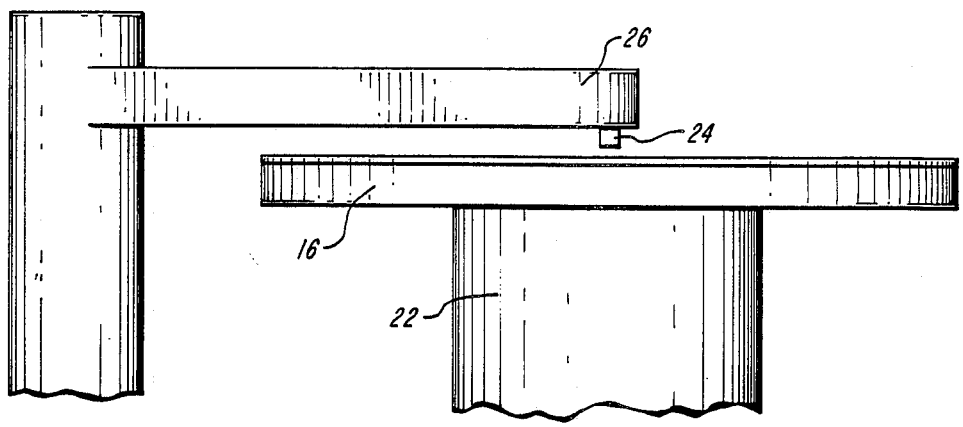
FIG. 2B is a side schematic cut-away view of the rigid disk system of FIG. 2A.

An example of a rotary actuated disk system is shown in FIGS. 2A and 2B. The system includes a disk 16 which is mounted to a hub 18 via a clamp ring 20. The disk 16 rotates at high speed (approximately 3600 RPM) about the central axis 22. This hub 22 is driven by a motor (not shown). A read-write head 24 in a conventional magnetic recording system is mounted to an arm 26 which is rotated via a stepper motor or under servo control about the arm axis 28 to position the head 24 over a selected track on the disk 16.

In magneto-optic systems, the heads 8 or 24, include a laser diode and collimating optics. The data may be read via the use of the Kerr affect or by use of a conventional magnetic read head to sense the orientation of magnetized dipoles.

In typical hard disk systems, the head 24 is biased toward the disk and head-disk separation, in operation, is maintained via an air bearing. The flying height of a head in a hard disk system in which the head is supported on an air bearing is a function of the relative velocity between the head and the disk. Thus, the higher the relative velocity between the head and the disk, the greater the flying height.

The velocity of the head with respect to the disk at any given track location (radius) of the disk is equal to the circumference of the track times the speed of revolution. Table 1 below illustrates the relative velocities between the head and disk in a system with a rotational speed of 3600 RPM for radii between 10 and 24 centimeters, corresponding approximately to the useful recording area on a nine inch disk.

TABLE 1

| Velocity as a function of diameter (Rotational Speed = 3600 RPM) | |
|---|---|
| CM | CM/SEC |
| 10 | 1884.954 |
| 11 | 2073.449 |
| 12 | 2261.944 |
| 13 | 2450.440 |
| 14 | 2638.935 |
| 15 | 2827.431 |
| 16 | 3015.926 |
| 17 | 3204.421 |
| 18 | 3392.917 |
| 19 | 3581.412 |
| 20 | 3769.908 |

TABLE 1-continued

| Velocity as a function of diameter (Rotational Speed = 3600 RPM) | |
|---|---|
| CM | CM/SEC |
| 21 | 3958.403 |
| 22 | 4146.898 |
| 23 | 4335.394 |
| 24 | 4523.889 |

Figure 3:
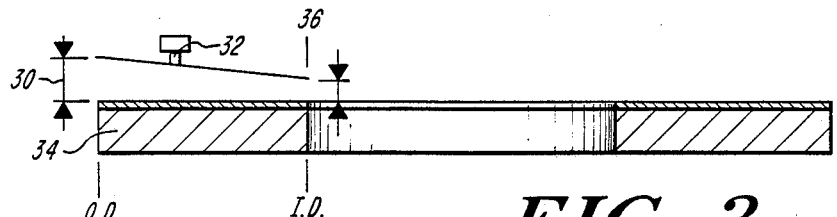
FIG. 3 is a side schematic cross-sectional view of a conventional rigid disk system illustrating the variation in flying height as a function of the radial location of the head.
Figure 4:
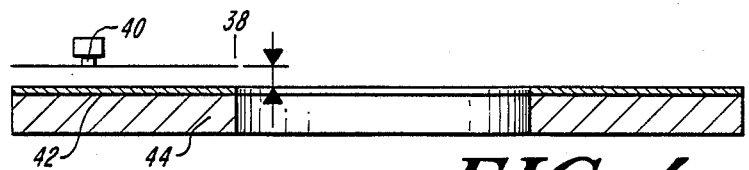
FIG. 4 is a side schematic cross-sectional view illustrating a rigid disk system in accordance with the present invention in which the head exhibits a substantially constant flying height.

As apparent from the table, the relative velocities between the head and disk on a 240 millimeter (nine inch) disk vary by over a factor of two. Thus, as illustrated in FIG. 3, in conventional hard disk systems, the flying height 30 of the head 32 when positioned over the outer diameter of the disk 34 (track 0) greatly exceeds the flying height 36 when the head 32 is positioned at the inner diameter Since greater linear recording densities may be achieved by reducing the flying height, it is desirable to maintain a constant minimum flying height 38 of a head 40 with respect to a surface 42 of a disk 44, as illustrated in FIG. 4. By optimizing (i.e. minimizing the flying height at or near the outer diameter of the disk, as opposed to the inner diameter as in conventional hard disk systems, the storage capacity of the disk system may be increased by in excess of 80 percent. Furthermore, the access time may be reduced nominally by a factor of 3 to 1 as a consequence in a reduction in the head travel time.

In accordance with the present invention, the flying height of the head 40, with respect to the surface 42 of a disk is controlled via magnetic attraction and/or repulsion and, more specifically, by varying the magnetic fields between opposing magnetic field generating devices so as to maintain a selected head flying height irrespective of the radial position of the head.

Figure 5A:
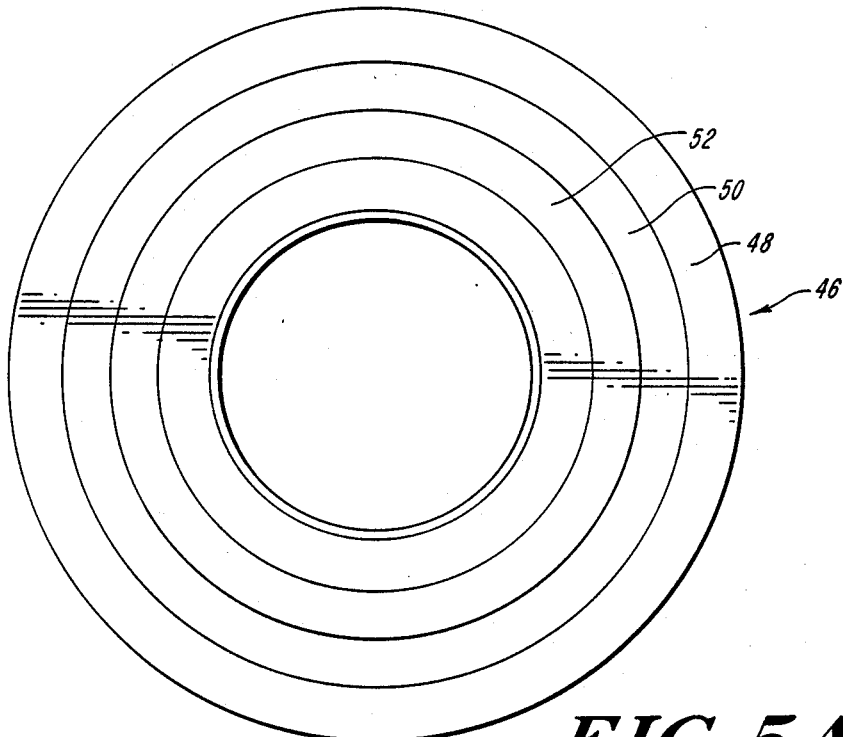
FIG. 5A is a top schematic view of a rigid disk including separate annular signal storage, levitation control and servo rings in accordance with the present invention.
Figure 5B:
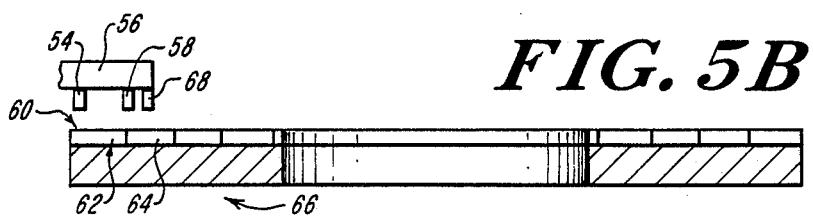
FIG. 5B is a side cross-sectional view of the rigid disk illustrated in FIG. 5A and a head assembly in accordance with the present invention.
Figure 12:
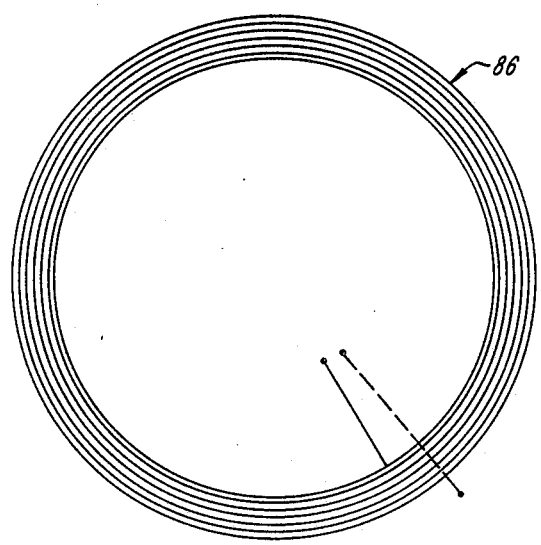
FIG. 12 is a top schematic view of a magnetic field generating means in the form of a coil which may be employed as the levitation control layer illustrated in FIG. 5A or the levitation control layer illustrated in FIG. 10.

One embodiment of the invention is illustrated in FIGS. 5A and 5B. As illustrated in FIG. 5A, the disk 46 is divided into a number of concentric rings. The outer ring 48 comprises the signal storage area. If employing conventional magnetic recording techniques, conventional magnetic coatings and/or thin film coatings are applied to the area defined by the annular ring 48 in accordance with techniques well known in the art. The next intermost ring 50 comprises a levitation control area. The ring 50 includes a layer of a material which becomes magnetic upon the application of current and which generates a magnetic field proportionate to the applied current. Ferrites or materials having similar characteristics may be employed for the levitation control layer. Alternatively, a layer of a permanent magnetic material may be employed for ring 50. The innermost ring 52 is employed for servo signals in accordance with conventional techniques well known in the art. As illustrated in FIG. 5B, a head 54 is mounted to an arm 56. Likewise, a magnetic generating means 58 such as a coil or a permanent magnet, is mounted to the arm and located inward of the head by a distance substantially equal to the outer diameter of the outer ring 48 less the outer diameter of the levitation control ring 50. A deadband may be provided between the signal storage ring 48 and the levitation control ring 50. Thus, activation of a magnetic field generating means 58, such as a coil will not corrupt data stored in the signal storage area defined by ring 48. The flying height of the head 54 with respect to the surface 60 of the signal storage layer 62 is controlled by varying the magnetic attraction and/or repulsion of the magnetic field generating means 58 with respect to the levitation control layer 64. In an embodiment wherein the magnetic field generating means 58 is a coil and the layer 64 comprises a permanent magnetic layer, the attraction and/or repulsion is controlled by varying the direction and magnitude of an applied current through the coil 58. Alternatively, in an embodiment wherein the magnetic field generating means 58 is a permanent magnet and the magnetic field generator means 64 is a layer of a material which becomes magnetic upon application of current, the attraction and/or repulsion between the layer 64 and the magnet 58 may be varied by varying the direction and magnitude of the current through the layer 64. Alternatively, the magnetic field generating means 64 may include a coil 86, which produces a magnetic field upon application of an electric current as shown in FIG. 12. The magnitude and direction of the magnetic field is controlled by varying the magnitude and direction of the current applied to the coil. Electrical connection to the magnetic field generating means 64 may be made through any rotary contacting means well known in the art. In another embodiment of the invention, the magnetic field generating means 58 is a coil in which the magnetic field is varied with the direction and magnitude of an applied current and the levitation control layer 64 is a material, such as ferrite, which produces a magnetic field upon the application of an electrical current. The attraction and/or repulsion between the magnetic field generating means 58 and the layer 64 is controlled by controlling the respective currents through the field generating means 58 and/or the layer 64. In accordance with the above technique, the flying height of the head 54 with respect to the surface 60 of the signal storage layer 62 may be controlled to achieve a substantially constant flying height across the useful storage area via well known analog servo and/or digital servo or look-up table techniques.

A position sensor is provided to generate a signal representative of the radial location of the head with respect to the disk. As illustrated in FIG. 6, the output signal from a track or radial position sensor, is applied to a current source which in turn varies the magnetic field through either the magnetic field generating means 58 and/or the layer 64 to produce a greater magnetic attraction with increasing radius thereby producing a force substantially equal and opposite incremental force caused by the to the increasing velocity between the head and the disk in systems employing an air bearing suspension.

As illustrated in FIG. 7, a curve fit generator may be employed, to compensate for any non-linearity in flying height with increasing velocity.

Alternatively, magnetic repulsion may be employed to maintain a substantially constant flying height between the head 54 and the surface 60 of the signal storage layer 62 over the useful storage area. In such a system, the arm 56 is biased downward toward the disk 66 via springs, gravity, or any other suitable means for applying force. A permanent magnet 68 (illustrated affixed to the arm 56) has poles magnetically aligned to repel magnetic layer 64 thereby preventing the head 54 contacting the surface 60 of the signal storage layer 62 The magnetic field generating means 58 may be employed in addition as hereinabove described, to maintain a substantially constant flying height of the head 54 with respect to the surface 60 of the signal storage layer 62 by compensating for variations in flying height associated with changes in relative velocities between the head 54 and the disk 60 as a function of the radial location of the head.

As illustrated in FIG. 8, in addition to a track sensor 71, a rotational speed sensor 70 is employed to provide a signal to a current generator 72 to compensate for variations in velocity due to variations in the rotational speed of the disk.

As illustrated in FIG. 9, a proximity sensor 74 is employed to sense the flying height of the head 54 with respect to the surface 60 of the storage layer 62. The magnetic attraction and/or repulsion via magnetic field generating means 58 is then served to maintained a constant flying height across the useful storage area.

By employing magnetic repulsion to maintain a separation between the head and the underlying surface of the disk, via a permanent magnet bias, the problems associated with head landing and take-off are substantially avoided and/or eliminated. Furthermore, as the head becomes closer to the disk surface, the repelling magnetic forces substantially increase so as to greatly reduce the likelihood of head "crashes" known to occur in conventional rigid disk systems. The use of repelling permanent or electromagnetic magnets to bias the head away from the surface of the disk, produces a "ruggedized" drive with greater immunity to shock and vibration than conventional drives since the repelling magnetic forces substantially reduce the likelihood of contact between the head and the underlying disk surface.

Figure 10:
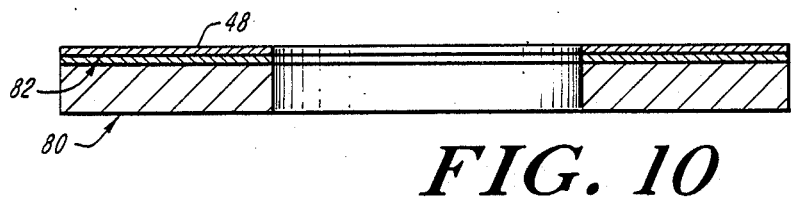
FIG. 10 is a side schematic cross-sectional view of a rigid disk showing an optical storage layer applied over a magnetic levitation layer.

Another embodiment of the present invention for use in conjunction with an optical disk system is illustrated in FIG. 10. As shown, the disk 80 includes a magnetic layer 82 under the optical data layer 84. Because the magnetic layer 82, has no effect upon the ability to read an overlying optical layer 84, the levitation layer 82 may be coextensive with the optical signal storage layer 84.

Finally, in systems employing magnetic and magneto optic storage techniques, a magnetic levitation layer may be provided coextensive with the signal storage layer by combining vertical and horizontal magnetic polarization techniques; one for purposes of signal storage and the other for purposes of flying height control.

The invention hereinabove described not only provides means for compensation for variations in flying height due to use of an air bearing support system for a head but in addition, provides a means for controlling the flying height of a head in thin atmospheres or in space where air bearings are unsuitable.

Additionally, by assuring a substantially uniform flying height, it is possible to fly the head at a lower flying height than achieved in conventional drives permitting a greater linear recording density across the entire useful storage area and greater disk capacities.

Figure 11:
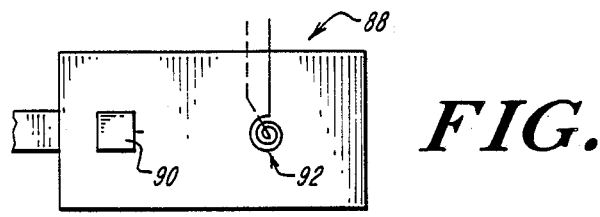
FIG. 11 is a bottom schematic view of a head assembly including a head and a magnetic field generating means in accordance with the present invention.

As illustrated in FIG. 11, the head assembly 88 may include a read and/or write head 90 and a magnetic field generating means 92 which may be a permanent magnet or alternatively an electromagnetic. When an electromagnetic field means is employed, the current applied may be varied to control the direction and magnetitude of the resultant field which interacts with a magnetically susceptible material either on the rigid disk or on a datum (such as the disk case, to adjust the flying height). Alternatively, when a permanent magnet is employed as the field generating means 88, the flying height is controlled by producing a magnetic field via a generator.

Figure 13:
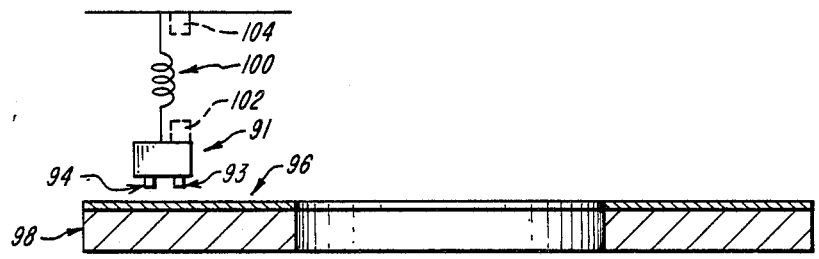
FIG. 13 is a side schematic view illustrating a rigid disk system in accordance with the present invention.

As shown schematically in FIG. 13, a head assembly 91 supporting a head 93 and a magnetic field generating means 94 may be biased away from the surface 96 of the disk 98 via the use of a force caused by a spring 100 (shown schematically). The flying height between the head 93 and the surface 96 is then controlled by magnetic attraction between the generating means 94 and the disk 98 as hereinbefore discussed. The generating means 94 may be either an electromagnetic or a permanent magnet as a magnetic field generator associated with the disk may be employed to cause the attractive forces which control the flying height against a spring bias through the use of repelling magnetic field generating means 102 and 104.

In magnetic disk systems, the signal layer may be coextensive with the magnetic attraction and/or repulsion layer by fabricating the respective layers of materials with differing magnetic characteristics and separating the data signal information via filtering and signal processing techniques known in the art. Alternatively, the domain characteristics or spectural characteristics of the magnetic material may be exploited to permit the signal and magnetic control layer to be coextensive.

The present invention may be applied in disk systems employing single or multiple platters.

Figure 14A:
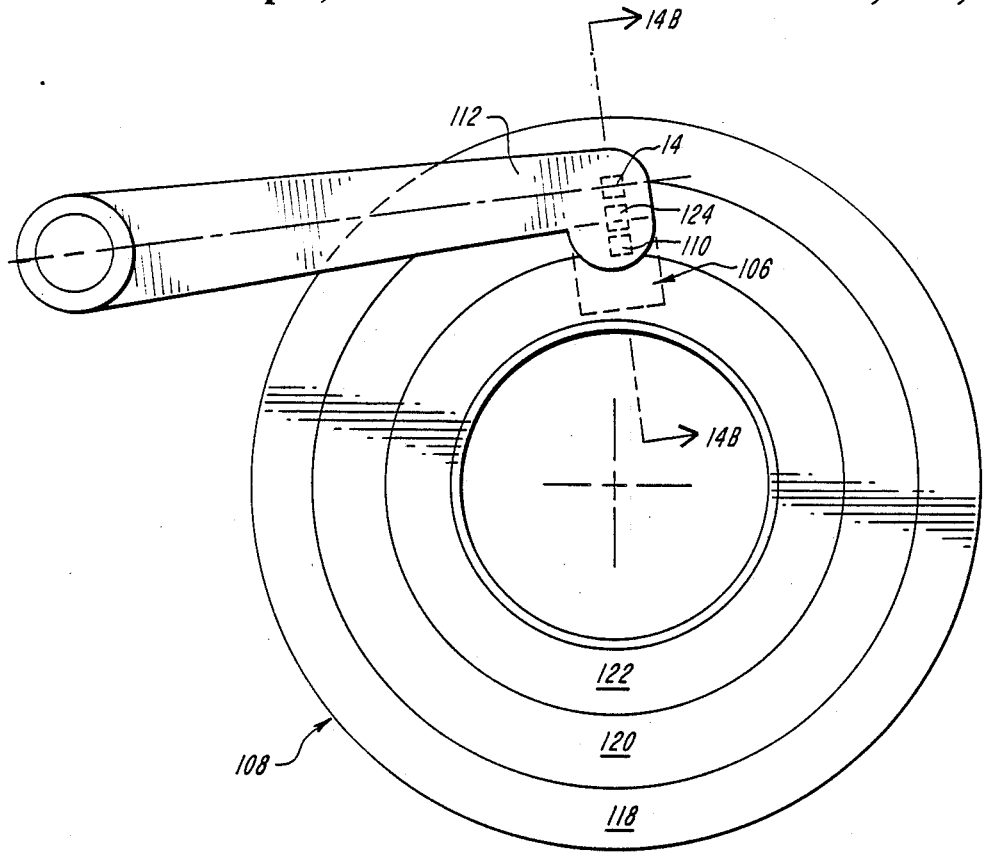
FIG. 14A is a top schematic view of a rigid disk system in accordance with the present invention in which a magnetic field generator and the read and/or write head are disposed on opposite sides of disk.
Figure 14B:
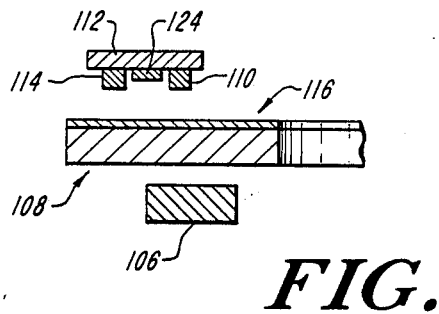
FIG. 14B is a side schematic cross sectional view of FIG. 14A through plane 14B.

In another embodiment illustrated in FIGS. 14a and 14b, a first magnetic field generator 106 such as a permanent magnet or an electromagnet is disposed under the disk 108 and a second magnetic field generator 110 is disposed on the arm 112 supporting the read and/or write head 114. At least one of the magnetic field generators 106 or 110 is controllable to vary the magnitude of the resulting magnetic field so as to permit control of the flying height of the head 114 above the surface 116 of the disk 108. In the illustrated embodiment where the disk is partitioned into an annular data storage ring 118, a control ring 120 and a servo ring 122, the first magnetic field generator 106 is disposed under the control ring 120 along the path traversed by the second magnetic field generator 110 mounted to the arm 112. On a system in which a substantial portion of the disk is dedicated for data storage, as for example in an optical disk, the first magnetic field generator 106 is of a length substantially coextensive with the distance traversed by the second magnetic field generator 110. It will be appreciated that the presently described technique may be employed to achieve both magnetic attraction between the first and second magnetic field generator or repulsion, as desired.

Data may be stored on both sides of the disk 108 while controlling the flying height of the head as hereinbefore described by offsetting the arm assemblies and the respective magnetic field generators on opposing sides of the disk.

A piezoelectric transducer 124, or any other transducer of a type known in the art, may be employed to provide an output signal representative of the flying height of the head 114 above the surface 116 of the disk 108 as shown in FIGS. 14a and 14b. Additionally, the arm 112 may be fabricated of a piezoelectric material and employed as a transducer which provides a signal used to control the flying height as discussed above.

The above described invention is illustrative of a novel method and apparatus which permits improved flying height control of a head with respect to the surface of a disk and overcomes significant disadvantage of conventional rigid disk drives. Other modifications, embodiments and departures from the present disclosure without departing from the inventive concept contained herein. Consequently, the invention is to be viewed as embracing each and every novel feature and novel combination of features present in or possessed by the technique and apparatus herein disclosed and are limited solely by the scope and spirit of the apended claims.

What is claimed is:

1. A disk system including means for preventing the corruption of stored information comprising:
    a platter having a substantially planar first surface;
    a layer of material disposed on said platter first surface for storage of data, said layer having an inner surface adjacent said platter first surface and an outer surface;
    means for reading data stored on said layer, said reading means having a lower surface;
    means for supporting said reading means such that said reading means lower surface is adjacent said layer outer surface;
    first means associated with said reading means for providing a magnetic field of a preselected polarity substantially perpendicular to said platter first surface;
    second means associated with said platter for providing a magnetic field substantially perpendicular to said platter first surface, said second means opposing said first means and having its polarity selected such that said first means exerts a repelling force on said second means; and
    said first and second means for providing a magnetic field being cooperative to prevent the lower surface of said reading means from contacting said layer outer surface via magnetic repulsion.

2. The apparatus of claim 1 wherein said first means for providing a magnetic field includes a permanent magnet.

3. The apparatus of claim 1 wherein said second means for providing a magnetic field includes a permanent magnet.

4. The apparatus of claim 1 wherein said first and second means for providing a magnetic field each include a permanent magnet.

5. The apparatus of claim 1 wherein said reading means includes a head for reading said data stored on said layer and having a lower surface adjacent said layer outer surface.

6. A method for preventing head crashes in a disk system having a platter with a substantially planar first surface, a layer of material disposed on said platter for storage of data, said layer having an inner surface adjacent said platter and an outer surface, means for reading said data stored on said layer, said reading means having a lower surface, means for supporting said reading means such that said reading means lower surface is adjacent said layer outer surface, comprising the steps of:
    generating a first magnetic field of a preselected polarity and substantially perpendicular to said platter with a first field generator associated with said reading means;
    generating a second field generator which is substantially perpendicular to said platter and opposing said first magnetic field such that said first magnetic field repels said second magnetic field;
    maintaining a separation between the lower surface of said reading means and the outer surface of said layer via magnetic repulsion of said first and second magnetic fields produced respectively by said first and second field generators.

* * * * *